US006782108B2

(12) United States Patent
Shibata

(10) Patent No.: US 6,782,108 B2
(45) Date of Patent: Aug. 24, 2004

(54) DEVICE FOR AND METHOD OF MIXING AUDIO SIGNALS

(75) Inventor: Koichiro Shibata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 10/286,110

(22) Filed: Nov. 1, 2002

(65) Prior Publication Data

US 2003/0059067 A1 Mar. 27, 2003

Related U.S. Application Data

(62) Division of application No. 09/138,463, filed on Aug. 21, 1998.

(30) Foreign Application Priority Data

Aug. 22, 1997 (JP) ........................................ 9-226541

(51) Int. Cl.[7] ........................................ H04B 1/00
(52) U.S. Cl. ........................................ 381/119
(58) Field of Search ........................................ 381/119

(56) References Cited

U.S. PATENT DOCUMENTS 2,225,196 A * 12/1940 Miessner ..................... 381/63
4,024,344 A * 5/1977 Dolby et al. .................. 381/27
5,896,459 A * 4/1999 Williams, Jr. ............... 381/119
6,301,365 B1 * 10/2001 Yamada et al. ............. 381/119

FOREIGN PATENT DOCUMENTS

JP 63-6782 2/1988

* cited by examiner

*Primary Examiner*—Minsun Oh Harvey
*Assistant Examiner*—Brian Pendelton
(74) *Attorney, Agent, or Firm*—Morrison & Foerster LLP

(57) ABSTRACT

Audio signals of a plurality of input channels are received via corresponding input terminals. First adjusting section adjusts respective volume levels of the audio signals received via the input channels. First mixing section mixes the audio signals, having been adjusted in volume level by the first adjusting section, to thereby provide a mixed signal. The mixed signal is distributed to a plurality of channels. Second adjusting section also adjusts respective volume levels of the audio signals received via the input channels. For each of the channels, a second mixing section mixes the received audio signal, having been adjusted in volume level by the second adjusting section, with the mixed signal distributed to that channel. Thus, for each of the channels, there is provided an output signal comprising a mixture of the received audio signal and the mixed signal. The thus-provided output signals can be listened to or monitored via headphones or the like on a channel-by-channel basis. Particular mixing circuit for one channel in the second mixing section can be extracted and arranged as a handy-type headphone amplifier device attachable to headphones.

7 Claims, 7 Drawing Sheets

DEVICE FOR AND METHOD OF MIXING AUDIO SIGNALS

This application is a division of application Ser. No. 09/138,463, filed on Aug. 21, 1998.

BACKGROUND OF THE INVENTION

The present invention relates to mixers for mixing audio signals and distributing the mixed audio signal (i.e., audio signal mix) and also relates to headphone amplifiers for delivering audio signals to headphones.

As well known, the mixers are means for mixing audio signals supplied from a plurality of sound sources. Today, the mixers are used widely in a variety of applications and come in various types to meet various demands.

FIG. 7 is a diagram illustrating an example of a relatively inexpensive portable-type mixer. This mixer is capable of mixing audio signals, such as those of tones performed on a musical instrument, for up to n channels and thereby generating stereophonic audio signals of left and right channels having desired sound image localization and stereo balance. Thus, with the mixer, it is possible to record audio signals generated from an ensemble performance by a plurality of human players or audibly reproduce, through one or more speakers, tones obtained from an ensemble performance. Generally, in executing an ensemble performance using a mixer, the players tend to worry about whether the ensemble performance is progressing as desired and want to directly check ensemble-performance tones produced via the mixer rather than those reproduced through the speakers. Where the mixer has an output terminal for connection with headphones, the ensemble-performance tones produced via the mixer can be checked through the headphones by just connecting the headphones to the output terminal. However, because the portable mixer, such as shown in FIG. 7, normally has only one headphone output terminal, it allows only one player to use the headphones.

Therefore, to allow all the players to monitor the ensemble performance using headphones, it is necessary to provide a distributor means that gives out the audio signals through the headphone output terminal to the individual sets of the headphones. As a typical example of the distributor means, a headphone amplifier as illustrated in FIG. 8 is often used in combination with the mixer. By the combined use of the mixer and headphone amplifier, each of the players can directly check the mixed ensemble-performance tone to thereby ascertain whether the ensemble performance is progressing in a desired manner as a whole. However, it may not be sufficient to check the ensemble performance as a whole, and each of the players might still want to know whether his or her own performance is being executed as desired. Thus, there has been a demand for a facility to allow each of the players to check his or her own performance in addition to the mixed ensemble-performance tone.

One possible approach to meed such a demand is to provide a separate mixer for each of the players as illustrated in FIG. 9. In the example of FIG. 9, mixers M1 to Mn are provided in corresponding or linked relation to the individual players. The headphone output terminal of the mixer M1 is connected with headphones of a first player, the headphone output terminal of the mixer M2 is connected with headphones of the second player, and similarly the headphone output terminal of the mixer Mn is connected with headphones of the nth player. Each of the mixers M1 to Mn mixes audio signals of first to nth channels generated by performances of the first to nth players. To allow each of the players to check his or own performance on a musical instrument, it is only necessary for each of the mixers to mix the audio signals of the individual channels with such weights that the audio signals of the corresponding channel are emphasized over those of the other channels. Namely, the mixer M1 associated with the first player executes the mixing after increasing the volume level of the audio signals of the first channel obtained from performance by the first player, the mixer M2 associated with the second player executes the mixing after increasing the volume level of the audio signals of the second channel obtained from performance by the second player, and so on. Similar technique is disclosed in Japanese Utility Model Publication No. 63-6782.

With the conventional technique illustrated in FIG. 9 or disclosed in the publication, each of the players can monitor or listen to his or her own solo performance with increased volume, against the background of the mixed ensemble-performance tone with lower volume, to ascertain whether the solo performance is being executed as desired. However, the conventionally-known technique is very uneconomical in that it requires a separate mixer for each of the players although ensemble-performance tones can normally be obtained through audio signal mixing using only one mixer.

SUMMARY OF THE INVENTION

It is therefore an object of the present invention to provide a mixer and a headphone amplifier which can fulfil the above-mentioned demand and yet are economical and simple in construction.

According to an aspect of the present invention, there is provided a mixer device which comprises: a first mixing circuit that mixes audio signals received via a plurality of input channels and thereby outputs a resultant mixed audio signal; and a second mixing circuit that individually mixes each of the audio signals received via the input channels and the mixed audio signal output by the first mixing circuit and thereby provides a mixed output signal for each of the channels, the second mixing circuit being capable of separately adjusting a mixing level of each of the audio signals received via the input channels.

If the audio signals received via the individual input channels are each called a "solo-performance signal", the mixed audio signal output by the first mixing circuit combining together these received audio signals may be called an "ensemble-performance signal". Of course, the first mixing circuit can adjustably mix the received audio signals at separately-set mixing levels, using volume controls. The second mixing circuit receives the mixed audio signal, i.e., ensemble-performance signal and individually mixes it with each of the audio signals, i.e., solo-performance signal received via the input channels. In this way, the audio signal or solo-performance signal, received by any one of the input channels, can be mixed with the ensemble-performance signal. If a player performing a given musical instrument inputs an audio signal of his or her performance tone through a particular one of the input channels and listens, via headphones or the like, to a signal produced from mixing of the thus-received or input audio signal (solo-performance signal) and the ensemble-performance signal at suitably adjusted levels, the player can catch or recognize his or her own performance and other's performance in combined form and raise or lower the volume of his or her own performance on the musical instrument, which would prove very convenient. Besides, because the mixing of all the audio signals received via the input channels is executed by the first mixing circuit, only one such mixing circuit is sufficient, which would significantly simplify the construction of the mixer device.

According to another aspect of the present invention, there is provided a mixer device which comprises: a first mixing circuit that distributes audio signals received via a plurality of input channels respectively to a plurality of reproducing channels and mixes the audio signals, received via the input channels, in each of the reproducing channels, to thereby output mixed audio signals through the individual reproducing channels, the first mixing circuit being capable of, for each of the input channels, adjusting a mixing level of the audio signal and a distribution level ratio of the audio signal to the individual reproducing channels; and a second mixing circuit that, for each of the audio signals received via the input channels, mixes the audio signal and the mixed audio signal output by the first mixing circuit and thereby provides a mixed output signal for each of the input channels and for each of the reproducing channels, the second mixing circuit being capable of separately adjusting a mixing level of each of the audio signal received via the input channels.

The plurality of reproducing channels are left and right channels intended for stereophonic reproduction or sound image localization, and the first mixing circuit is capable of, for each of the input channels, adjusting a mixing level of the audio signal and a volume level ratio of the audio signal to be distributed to the individual reproducing channels. Thus, the audio signals can be mixed in such a manner to have unique sound image localization and stereo reproduction ratio for each of the input channels. Further, for the audio signal (solo-performance signal) received via a particular one of the input channels, the second mixing circuit mixes the received audio signal with the mixed audio signal (ensemble-performance signal) of each of the reproducing channels output from the first mixing circuit, to thereby provide a mixed output signal for each of the reproducing channels corresponding to the particular input channel. In this case, the solo-performance signal to be mixed with the ensemble-performance signal is controlled only in its mixing level and no control is executed on its sound image localization, so that a player's solo performance can be recognized with centrally-localized sound image while the ensemble performance is recognized with unique sound image localization. As a result, the present invention achieves the mixing with realism.

According to still another aspect of the present invention, there is provided an amplifier device for use with a headphone, which comprises: a first input terminal that receives a first audio signal from an external source; a first output terminal that provides the first audio signal, received via the first input terminal, to outside the amplifier device; a second input terminal that receives a second audio signal from an external source; a mixing circuit that mixes the first and second audio signals received via the first and second input terminals, the mixing circuit including an operator for adjusting mixing levels of the first and second audio signals; and a second output terminal that supplies an output from the mixing circuit to the headphone. For example, if a performance output signal from a given player's musical instrument is fed to the first input terminal and the first output terminal is connected to an input of an audio mixer device, the performance output signal from the player's musical instrument can be mixed with a performance output signal from another player's musical instrument. Then, the second input terminal is connected to an output of the audio mixer device, so that a mixed output signal (ensemble-performance signal) from the audio mixer device is received as the second audio signal. In this way, the mixing circuit mixes the signal of the given player's own performance with the ensemble-performance signal, and the mixed result can be recognized via the headphone. Because the mixing to provide the ensemble-performance signal is executed by the external audio mixer device, the circuitry arrangement of the headphone amplifier can be simplified to a significant degree.

BRIEF DESCRIPTION OF THE DRAWINGS

For better understanding of the above and other features of the present invention, the preferred embodiments of the invention will be described in greater detail below with reference to the accompanying drawings, in which.

DETAILED DESCRIPTION OF THE PREFERRED EMBODIMENTS

Figure 1:
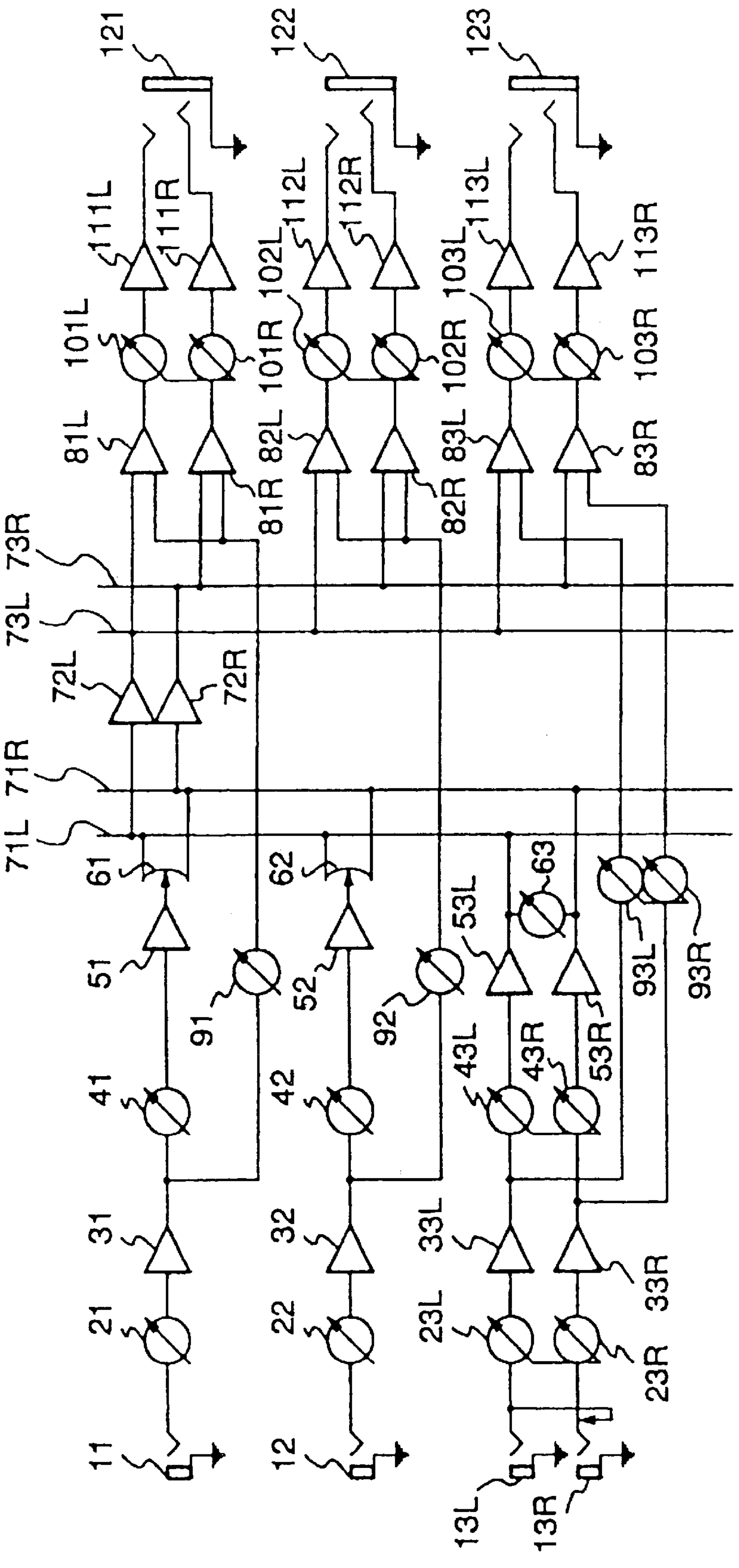
FIG. 1 is a circuit diagram illustrating a general structure of a mixer in accordance with a first embodiment of the present invention.

FIG. 1 is a circuit diagram illustrating a general structure of a mixer in accordance with a first embodiment of the present invention. The specifications of the mixer will be outlined at items (1) to (4) below:

(1) The mixer has n input channels and n output channels corresponding to the input channels; in the illustrated example of FIG. 1, the indefinite number "n" represents three. While the three input and output channels are shown in FIG. 1 as corresponding to each other on a one-to-one basis for ease of understanding, such an exact one-to-one correspondence between the input and output channels is not necessarily essential and only some of the input and output channels may correspond to each other on a one-to-one basis.

(2) The mixer is capable of mixing audio signals, received via the input channels, of up to n channels. Whereas the audio signals to be mixed include a monaural audio signal and stereophonic audio signals for left and right channels, the mixer executes the mixing in a stereophonic fashion. To this end, the mixer converts the input monaural audio signal into stereophonic audio signals prior to the mixing; the thus-converted stereophonic audio signals can be processed to have desired sound image localization. Also, the other audio signals, i.e., "original stereophonic audio signals" can be processed, prior to the mixing, to adjust sound image localization and left- and right-channel volume levels or stereo balance.

(3) The mixed audio signal (resultant audio signal mix) is output through the individual output channels as stereophonic audio signals. In addition to the mixed result (audio signal mix), the audio signal input through each individual input channel can be output through one of the output channels which is associated with the input channel, after being converted into stereophonic audio signals having a centrally-localized sound image. The audio signal output in this way will hereinafter be called a "solo-performance audio signal".

(4) Respective volume levels of the individual input audio signals to be mixed can be modified to thereby adjust the mixing weights of the audio signals. Alternatively, it is possible to adjust the volume level of the solo-performance audio signal, to be output through each of the output channels along with the mixed signal (audio signal mixture), independently for each of the output channels, while leaving the mixing weights unchanged.

Now, an exemplary detailed organization of the mixer will be described below with reference to FIG. 1.

In FIG. 1, monaural input terminals 11 and 12 correspond to the first and second input channels, respectively, to each of which a monaural audio signal is input. Stereophonic input terminals 13L and 13R correspond to the third input channel, to which left- and right-channel stereophonic audio signals are input. One of the stereophonic input terminals 13L may be used as a monaural input terminal. Note that the left- and right-channels for stereophonic reproduction and sound image localization (pan-pot) reproduction will hereinafter be called "reproducing channels".

Audio signals of the individual channels, received through the input terminals 11, 12, 13L and 13R, are adjusted to an appropriate range of volume levels by means of volume controls 21, 22, 23L and 23R and then amplified by means of headphone amplifiers 31, 32, 33L and 33R, respectively. Here, the adjusting operations of the volume controls 23L and 23R are controlled in linked relation to each other. The audio signals of the individual channels, output from the headphone amplifiers 31, 32, 33L and 33R, are each divided into two routes, on a channel-by-channel basis, so that one of the divided audio signals for each of the channels is delivered to a mixing system for mixing with the counterparts of the other channels while the other audio signal is delivered to a solo-performance-audio-signal volume adjusting system provided for that channel.

First, the mixing system will be described in the following paragraphs. Input volume controls 41, 42, 43L and 43R are means for adjusting the volume levels of the individual audio signals to be mixed; in other words, these are means for imparting mixing weights to the audio signals. Here, the adjusting operations of the volume controls 23L and 23R are controlled in linked relation to each other. The audio signals output from the headphone amplifiers 31, 32, 33L and 33R are passed through the input volume controls 41, 42, 43L and 43R for adjustment of their respective volume levels and then inverted by means of inverting amplifiers 51, 52, 53L and 53R, respectively.

Output signals from the inverting amplifiers 51 and 52 are fed to sound-image localizing sections 61 and 62, respectively, so that they are converted into left- and right-channel audio signals having sound image localization corresponding to respective operating states or positions of the localizing sections 61 and 62. Sound-image localizing/stereo balance adjusting section 63 is connected to respective outputs of the inverting amplifiers 53L and 53R, so as to adjust the sound image position and left and right volume levels of the stereophonic audio signals output from the inverting amplifiers 53L and 53R. In this way, left- and right-channel audio signals, of the first to third channels, can be obtained via the sound-image localizing sections 61 and 62 and inverting amplifiers 53L and 53R. Each of the audio signals associated with the left reproducing channel (L channel) is fed to a left channel bus 71L, while each of the audio signals associated with the right reproducing channel (R channel) is fed to a right channel bus 71R.

Then, the audio signals of the first to third channels fed to the left channel bus 71L are mixed on the bus 71L. The resultant mixed audio signal is inverted in level by an inverting amplifier 72L and then sent, via a next left channel bus 73L, to one input terminal of each of inverting amplifiers 81L to 83L associated with the first to third channels. Similarly, the audio signals of the first to third channels fed to the right channel bus 71R are mixed on the bus 71R. The resultant mixed audio signal is inverted in level by an inverting amplifier 72R and then sent, via a next right channel bus 73R, to one input terminal of each of inverting amplifiers 81R to 83R associated with the first to third channels. In the above-mentioned manner, one of the two signals divided from each of the output signals from the headphone amplifiers 31, 32, 33L and 33R is processed in the mixing system.

In the meantime, the other of the two signals divided from each of the output signals from the headphone amplifiers 31, 32, 33L and 33R is amplified independently into a solo-performance audio signal, which is passed to one of output systems associated with the first to third channels. More specifically, the audio signal of the first channel output from the headphone amplifier 31 is adjusted in volume level by a solo-performance volume control 91 and then sent to the other input terminal of the inverting amplifiers 81L to 81R as a solo-performance audio signal of the first channel having a centrally-localized sound image. The audio signal output from the headphone amplifier 32 is adjusted in volume level by a solo-performance volume control 92 and then sent to the other input terminal of each of the inverting amplifiers 82L to 82R as a solo-performance audio signal of the second channel having a centrally-localized sound image. The left- and right-channel audio signals output from the headphone amplifiers 33L and 33R are adjusted in volume level by solo-performance volume controls 93L and 93R and then sent to the other input terminal of the inverting amplifiers 83L to 83R as a solo-performance audio signal of the third channel. Here, the adjusting operations of the solo-performance volume controls 93L and 93R are controlled in linked relation to each other.

With the above arrangement, the input audio signal of each of the input channels, divided before the mixing system, is transferred as a solo-performance audio signal. The inverting amplifier 81L, for example, outputs an audio signal that is a sum of the mixed audio signal sent via the left channel bus 73L and the solo-performance audio signal of the first channel having been adjusted in volume by the solo-performance volume control 91. Similarly, each of the other inverting amplifiers 81R, 82L, 82R, 83L and 83R outputs an audio signal that is a sum of the mixed audio signal and the solo-performance audio signal of the associated channel having been adjusted in volume by the solo-performance volume control 91, 92, 93L or 93R.

The output signals from the inverting amplifiers 81L, 81R, 82L, 82R, 83L and 83R are delivered, through output volume controls 101L, 101R, 102L, 102R, 103L and 103R, to further inverting amplifiers 111L, 111R, 112L, 112R, 113L and 113R, from which they are supplied to the individual headphones connected to the headphone output terminals 121 to 123. The output volume controls 101L, 101R are provided for adjusting the volume levels of the headphones connected to the headphone output terminal 121 and are adjusted in linked relation to each other. Similarly, the output volume controls 102L, 102R and 103L, 103R are provided for adjusting the volume levels of the headphones connected to the headphone output terminals 122 and 123, respectively.

The following paragraphs describe a specific manner in which the mixer according to the first embodiment is used, assuming that three players (first to third players) perform an ensemble using three electronic or electric musical instruments, one for each player. These three musical instruments are connected with the mixer in such a way that audio signal of each tone performed by the first player is supplied to the monaural input terminal 11, audio signal of each tone performed by the second player is supplied to the monaural input terminal 12, and audio signal of each tone performed by the third player is supplied to the stereophonic input terminals 13L and 13R. The first to third players use their own headphones by connecting them to the headphone output terminals 121 to 123, respectively.

As the ensemble performance is carried out by the first to third players, audio signals generated from the three musical instruments are input to the mixer for predetermined mixing, and the resultant mixed audio signal of the ensemble-performance tones are transferred to the left- and right-channel buses 73L and 73R. The audio signals of the three player's performance tones contained in the mixed audio signal have respective volume levels corresponding to operating states or positions of the associated input volume controls 41, 42, 43L and 43R. Thus, the audio signals of individual performed tones can be mixed with desired weights by adjustment via the input volume controls 41, 42, 43L and 43R, and the resultant mixed audio signal is sent to the left- and right-channel buses 73L and 73R. Further, the audio signals output from the input volume controls 41, 42, 43L and 43R are mixed after having passed through the sound-image localizing sections 61 and 62 and sound-image localizing/stereo balance adjusting section 63. Thus, the audio signals of individual performed tones by the first to third player, constituting the mixed audio signal, can have desired sound image localization and left and right stereo balance.

To each of the headphones connected to the headphone output terminals 121 to 123 is supplied a sum of the mixed audio signal and the solo-performance audio signal corresponding to the performed tone by the corresponding (first, second or third) player. Here, respective volume levels of the solo-performance audio signals, output from the headphone output terminals 121 to 123, depend on the operating states or positions (operated amounts) of the solo-performance volume controls 91, 92, 93L and 93R. Thus, through operation of the associated solo-performance volume control 91, 92, 93L or 93R, each of the players can listen to his or her own solo performance tone at a desired volume level along with the ensemble-performance tones. Also, each of the players can adjust the general volume level of the ensemble-performance tones and solo-performance tone to be monitored thereby, by operating particular ones of the output volume controls 101L–103L and 101R–103R which are associated with the player's headphone. In the event that there is no need to monitor the solo-performance tone, each of the players is allowed to listen only to the ensemble-performance tones by setting the associated solo-performance volume control to a minimum level.

As stated earlier, the solo-performance audio signal is a stereophonic audio signal having a centrally-localized sound image. Therefore, if each individual performance tone contained in the ensemble-performance tones has a sound image localized off the center, each individual component tone in the ensemble-performance tones and the solo performance tone can be distinguished from each other on the basis of their respective sound image positions.

Figure 2B:
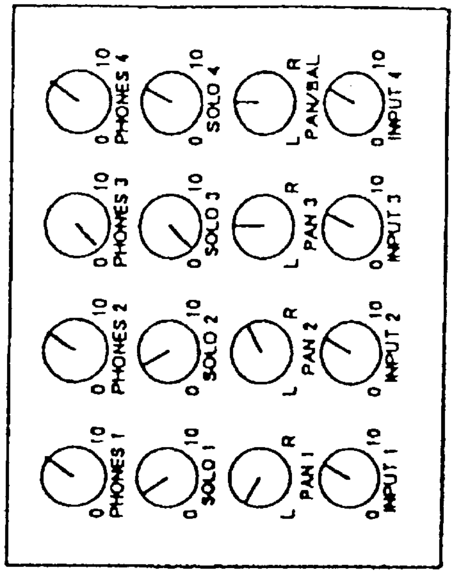
FIGS. 2A to 2C are diagrams illustrating further details of the mixer of FIG. 1.
Figure 2C:
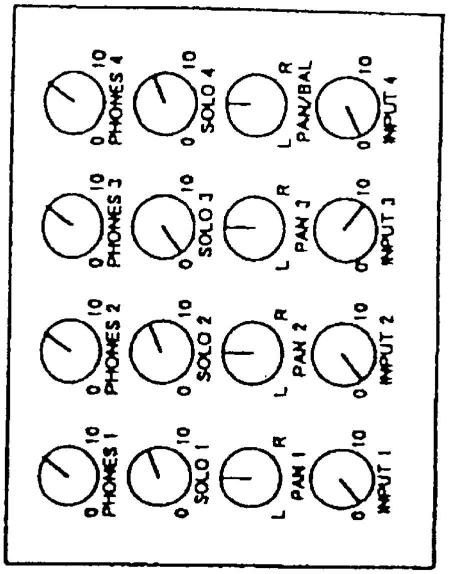
Figure 2A:
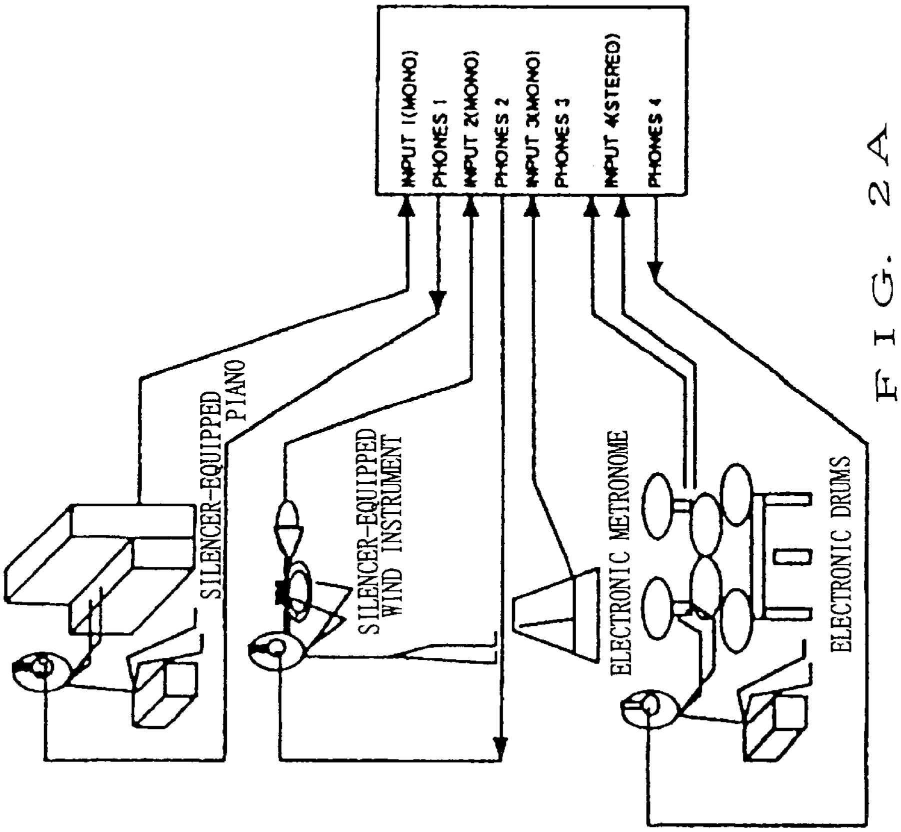

FIGS. 2A to 2C are diagrams illustrating further details of the above-described mixer. In FIGS. 2A to 2C, the mixer includes additional circuitry for another channel so as to process audio signals of up to four channels, although the fundamental organization and operational principle of the mixer are the same as described earlier in relation to FIG. 1.

First, FIG. 2A shows how the the mixer is connected with an electronic or electric musical instrument, where "INPUT 1" to "INPUT 3" represent monaural input terminals that are similar to the terminal 11 or 12 of FIG. 1. A silencer-quipped piano, a silencer-equipped wind instrument and an electronic metronome are connected respectively to these monaural input terminals in such a way that audio signals generated therefrom are supplied to the input terminals "INPUT 1" to "INPUT 3". "INPUT 4" represents a stereophonic input terminal that are similar to the stereophonic input terminals 13L and 13R. An electronic drum is connected to the stereophonic input terminal in such a way that audio signals generated therefrom are supplied to the input terminal "INPUT 4". Further, "PHONES 1" to "PHONES 4" represent headphone output terminals that are similar to the headphone output terminals 121 to 123 of FIG. 1. In this illustrated example, the player of the silencer-equipped piano uses headphones connected to the headphone output terminal "PHONES 1", the player of the silencer-equipped wind instrument uses headphones connected to the headphone output terminal "PHONES 2", and the player of the electronic drum uses headphones connected to the headphone output terminal "PHONES 4".

The "silencer-equipped piano" as used in the illustrated example is similar to an acoustic or natural piano but different in that it is modified to additionally include a silencer mechanism for preventing each hammer from hitting the corresponding string and an electronic tone generator for detecting a player's key operation to electronically generate a tone, as disclosed in, for example, Japanese Patent Laid-open Publication No. HEI-6-59667. The "silencer-equipped wind instrument" as used in the illustrated example is similar to an acoustic or natural wind instrument but different in that it is modified to additionally include a silencer mechanism for muting each generated tone and a circuit for picking up and electrically amplifying the generated tone, as disclosed in, for example, Japanese Patent Laid-open Publication No. HEI-8-194473. Further, the "electronic drum" as used in the illustrated example includes a plurality of pads and electronically generates a tone in response to player's hitting any one of the pads, and it is also capable of optionally allocating different tone colors to the individual pads and setting a sound image localization position for each of the pads (or tone colors) to thereby output a stereophonic tone, having a localized sound image, for each of the pads (or tone colors).

FIGS. 2B and 2C are diagrams illustrating operating states or positions (i.e., settings) of the various volume controls provided on the mixer. In these figures, four volume controls labeled "PHONES 1" to "PHONES 4" in the top row are for adjusting the volume levels of the headphones of the first to fourth channels, and they correspond to the output volume controls 101L to 103L and 101R to 103R of FIG. 1. Four volume controls labeled "SOLO 1" to "SOLO 4" in the second row are solo-performance volume controls, and they correspond to the solo-performance volume controls 91, 92, 93L and 93R of FIG. 1. Three operators "PAN 1" to "PAN 3" in the third row are for adjusting the respective sound image localization of the input audio signals of the first to third channels, and they correspond to the sound-image localizing section 61 or 62 of FIG. 1. Another operator labeled "PAN/BAL" next to the operators "PAN 1" to "PAN 3" in the third row are for adjusting the sound image localization or left and right volume levels (stereo balance) of the audio signals of the fourth channel, and it corresponds to sound-image localizing/stereo balance adjusting section 63 of FIG. 1. Further, four volume controls labeled "INPUT 1" to "INPUT 4" in the bottom row are for adjusting the volume levels of the audio signals of the first to fourth channels to be mixed, and they correspond to the input volume controls 41, 42, 43L and 43R of FIG. 1.

Under the settings as shown in FIGS. 2B and 2C, the mixer will operate as follows. First, under the settings of FIG. 2B, the players of the silencer-equipped piano, silencer-equipped wind instrument and electronic drum can listen to the ensemble-performance tones by means of their respective headphones. Of the ensemble-performance tones, the performed tone of the silencer-equipped piano will have a sound image localized on the left, the performed tone of the silencer-equipped will have a sound image localized on the right, and the beat sounds of the electronic metronome and electronic drum will have sound images localized at the center. Along with such ensemble-performance tones, each of the players can also listen to his or her own solo performance having a centrally-localized sound image, because the solo-performance volume controls of the first, second and third channels are not set to the minimum level in this case. Thus, the player of the silencer-equipped piano, for example, can monitor or listen to his or her own solo performance against the background of the ensemble-performance tones, to ascertain whether his or her own solo performance is progressing accurately to the beat sounds of the electronic metronome and electronic drum. Also, by operating the associated solo-performance volume control, each of the players can adjust the volume level of the solo performance alone while still maintaining the mixing condition of the ensemble-performance tones.

Under the settings of FIG. 2C, all the input volume controls, except for that of the third channel, are set to the minimum level. Thus, even when the silenced piano, silenced wind instrument and electronic drum are performed by the respective players and audio signals are generated therefrom, these generated audio signals are not subjected to the mixing process by the mixer and only each audio signal generated from the electronic metronome corresponding to the third channel is passed to the mixing process. As a consequence, only the audio signal generated from the electronic metronome will be supplied, as a mixed audio signal, to the headphones of the individual players. Thus, in this case, the players of the silenced piano, silenced wind instrument and electronic drum can perform the musical instruments while listening to the beat sounds of the electronic metronome and their own solo-performance tones via the headphones, by adjusting the solo-performance volume controls corresponding to the first, second and fourth channels, respectively.

The first embodiment of the present invention shown and described above may be modified variously without departing from the basic features of the invention. For example, whereas the output volume controls 101L to 103L and 101R to 103R are disposed after the inverting amplifiers 81L to 83L and 81R to 83R, respectively, in the example of FIG. 1, the output volume controls 101L to 103L may be inserted between the left-channel bus 73L and the inverting amplifiers 81L to 83L and the output volume controls 101R to 103R may be inserted between the right-channel bus 73R and the inverting amplifiers 81R to 83R. With this modification, it is possible for each of the players to adjust the volume level of only the ensemble-performance tones to be output to the headphones, rather than the volume levels of both the ensemble-performance tones and the solo performance tones, by operating the output volume control associated with the player's headphones.

Figure 3:
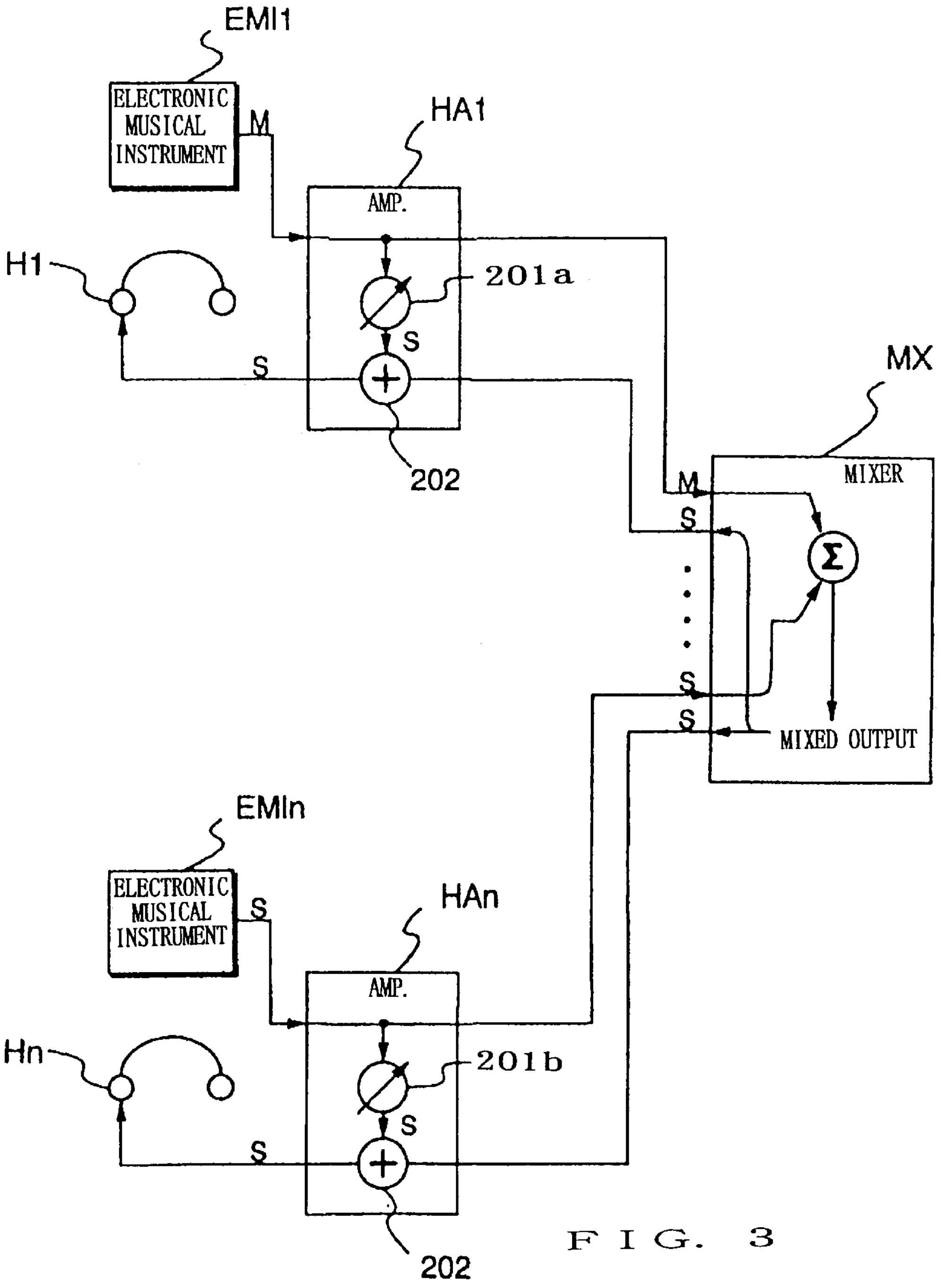
FIG. 3 is a circuit diagram illustrating a general structure of a mixer in accordance with a second embodiment of the present invention.

FIG. 3 is a circuit diagram illustrating a general structure of a mixer in accordance with a second embodiment of the present invention. In contrast to the above-described first embodiment where the circuitry for generating and supplying solo-performance audio signals to the individual headphones is provided integrally with the mixing circuit for mixing input audio signals and supplying the mixed result to the headphones, the second embodiment is characterized in that the circuitry for generating and supplying solo-performance audio signals to the individual headphones is provided separately from the mixing circuit.

In FIG. 3, the mixer MX mixes audio signals received via n input channels and outputs the mixed result (audio signal mix) via n output channels. Whereas the audio signals received via the input channels include monaural and stereophonic audio signals, the mixed result is output from the mixer as stereophonic audio signals. In FIG. 3, signal lines for transferring stereophonic audio signals are represented by character "S" while signal lines for transferring monaural audio signals are represented by "M".

Reference characters EMI1 to EMIn represent electronic (or electric) musical instruments, and H1 to Hn represent headphones used by players of the musical instruments. Further, reference characters HA1 to HAn represent portable headphone amplifiers attached to a waist belt or the like of the individual players, which supply the audio signals of tones generated by the musical instruments EMI1 to EMIn directly to the mixer and also generate solo-performance audio signals on the basis of the corresponding audio signals to supply the headphone amplifiers HA1 to HAn with the thus-generated solo-performance audio signals along with the mixed audio signal output from the mixer MX. Each of the headphone amplifiers HA1 to HAn includes a solo-performance volume control 201*a* or 201*b* and an adder 202. Here, the solo-performance volume control 201*a* is for adjusting the volume level of the monaural audio signals, while the solo-performance volume control 201*b* is for adjusting the volume level of the stereophonic audio signals.

In the example of FIG. 3, the electronic musical instrument EMI1 generates a monaural audio signal, and the headphone amplifier of the type having the solo-performance volume control 201*a*, like the amplifier HA1, is connected to every such electronic musical instrument which is arranged to generate a monaural audio signal. As the monaural audio signal is supplied, via the solo-performance volume control 201*a* and adder 202, to the headphone amplifier, it is adjusted to a volume level corresponding to the current operating position of the solo-performance volume control 201*a* and converted into stereophonic audio signals having a centrally-located sound image.

Further, in the example of FIG. 3, the electronic musical instrument EMIn generates stereophonic audio signals, and the headphone amplifier of the type having the solo-performance volume control 201*b*, like the amplifier HAn, is connected to every such electronic musical instrument which is arranged to generate stereophonic audio signals. As the stereophonic audio signals are supplied to the headphone amplifier, they are processed by the solo-performance volume control 201*b* for volume level adjustment while being maintained in the stereophonic form and then delivered to the adder 202.

In the second embodiment, the audio signals of performed tones generated by the electronic musical instruments EMIk (k=1–n) are supplied to the headphone amplifiers HAk (k=1–n), in each of which the supplied audio signal is divided into two routes. Then, one of the divided audio signals in each of the headphone amplifier is passed directly to the mixer MX for mixing, and the resultant mixed audio signal is sent back to the headphone amplifiers HAk. Further, in each of the headphone amplifiers HAk, the other of the divided audio signals is sent, via the solo-performance volume control 201*a* or 210*b*, to the adder 202 as a solo-performance audio signal. The adder 202 adds the solo-performance audio signal with the mixed audio signal passed directly from the mixer MX. Thus, the added results in the individual headphone amplifiers HAk are supplied to the associated headphones Hk (k=1–n).

Each of the players can adjust the volume level of the solo-performance audio signal by adjusting the operating position of the associated solo-performance volume control 201*a* or 210*b*. Thus, by adjusting the operating position of the associated solo-performance volume control 201*a* or 210*b*, each of the players is allowed to perform the electronic musical instrument while listening to or monitoring his or her own solo performance in addition to the ensemble-performance tones generated via the mixer MX.

Figure 4:
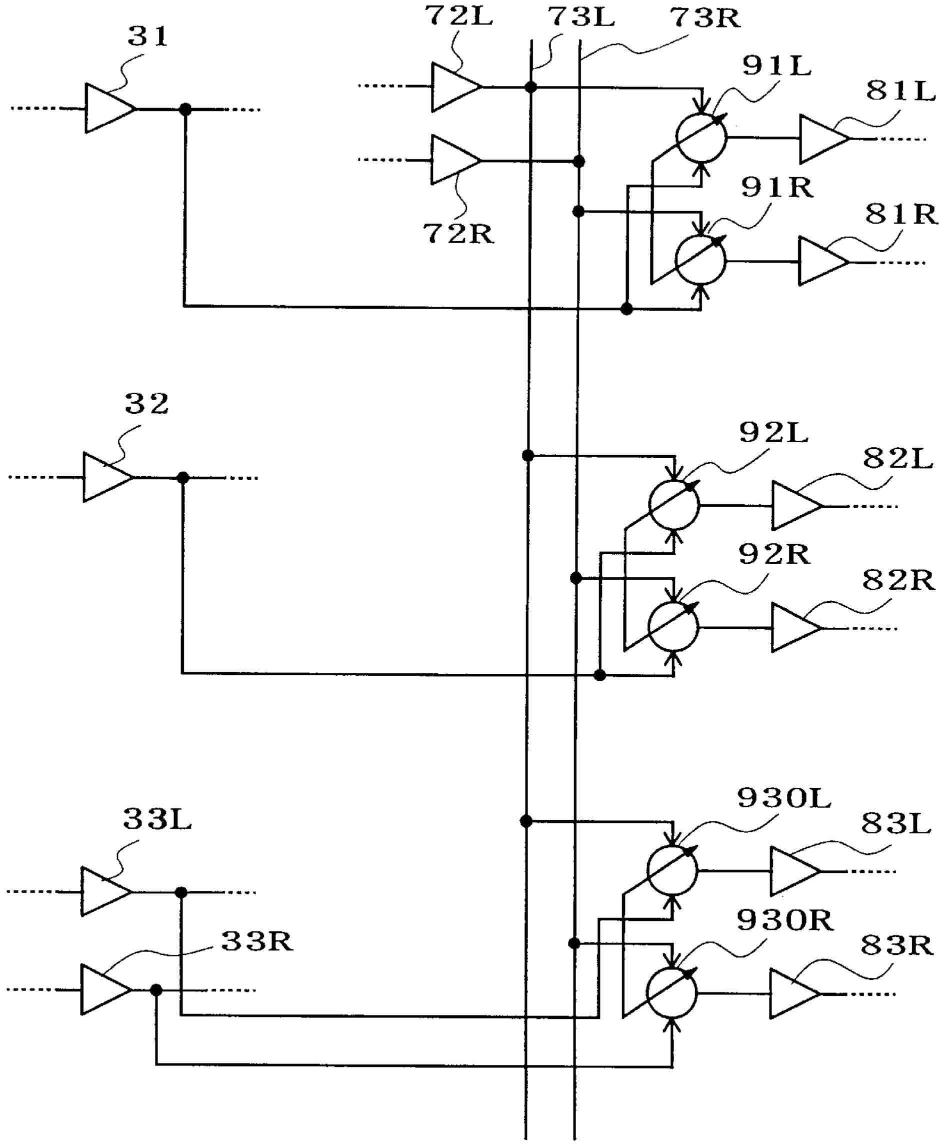
FIG. 4 is a circuit diagram illustrating a modification of the mixer shown in FIG. 1.

In the described embodiments, the solo-performance volume controls 91, 92, 93L, 93R, 201*a* and 201*b* are provided to adjust only the respective volume levels of the individual solo-performance tones; alternatively, these controls 91, 92, 93L, 93R, 201*a* and 201*b* may be modified to adjust a volume-level proportion or balance between the solo-performance tone and the ensemble-performance tones. To this end, it is only necessary that circuit portions, relating to the solo-performance volume controls 91, 92, 93L, 93R, 201*a* and 201*b* and inverting amplifiers 81L, 81R, 82L, 82R, 83L and 83R, in the embodiment of FIG. 1 be modified as shown in FIG. 4. Namely, in FIG. 4, in relation to the first channel for monaural audio signal, balance volume controls 91L and 91R are provided immediately before the respective inverting amplifiers 81L and 81R, in place of the solo-performance volume control 91. Each output from the headphone amplifier 31 of the first channel is passed to the balance volume controls 91L and 91R, and each output from the left-channel bus 73L is fed to the left-channel balance volume control 91L while each output from the right-channel bus 73R is fed to the right-channel balance volume control 91R. These left-channel and right-channel balance volume controls 91L and 91R are adjusted in linked relation to each other. In this way, the left-channel signal of the ensemble-performance tones and the solo-performance signal of the first channel are adjusted in volume level by the balance volume control 91L, while the right-channel signal of the ensemble-performance tones and the solo-performance signal of the first channel are adjusted in volume level by the balance volume control 91R. Similarly, in relation to the second channel for monaural audio signal, balance volume controls 92L and 92R are provided immediately before the respective inverting amplifiers 82L and 82R, in place of the solo-performance volume control 92. In relation to the third channel for stereophonic audio signals, balance volume controls 930L and 930R are provided immediately before the respective inverting amplifiers 83L and 83R, in place of the left and right solo-performance volume controls 93L and 93R; in this case, the left-channel signal of the solo performance (output from the headphone amplifier 33L) is passed to the left-channel balance volume control 930L while the right-channel signal of the solo performance (output from the headphone amplifier 33R) is passed to the right-channel balance volume control 930R.

Figure 5:
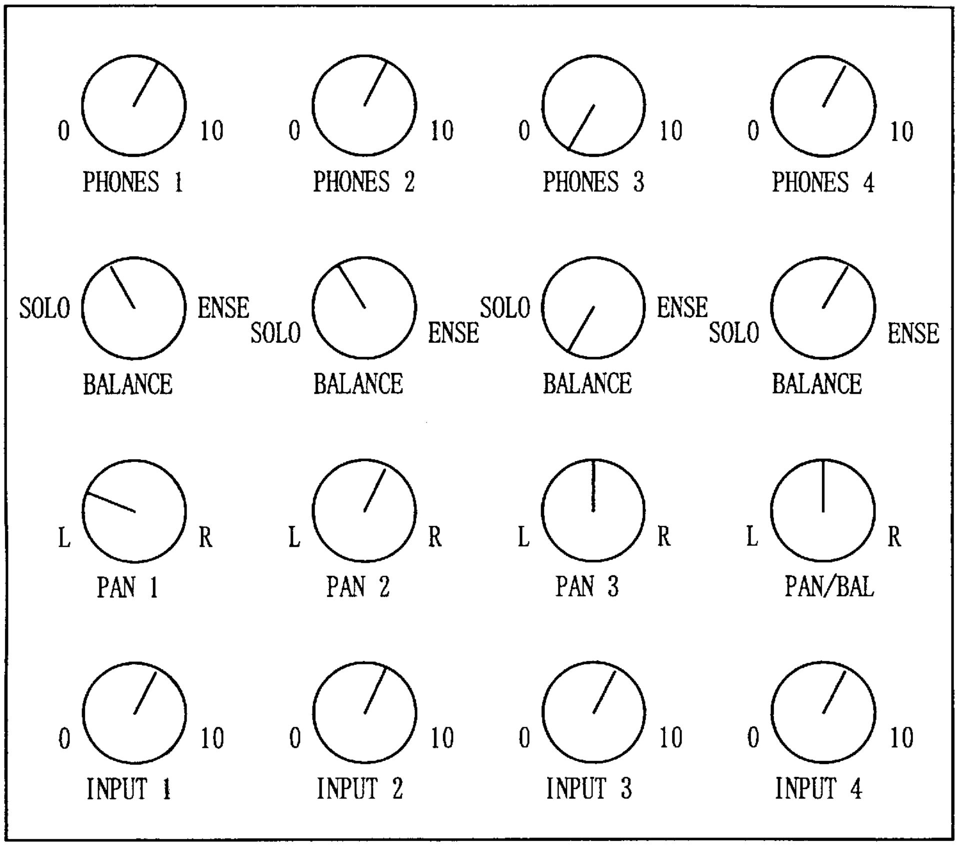
FIG. 5 is a diagram illustrating a modification of settings shown in FIG. 2B.
Figure 6:
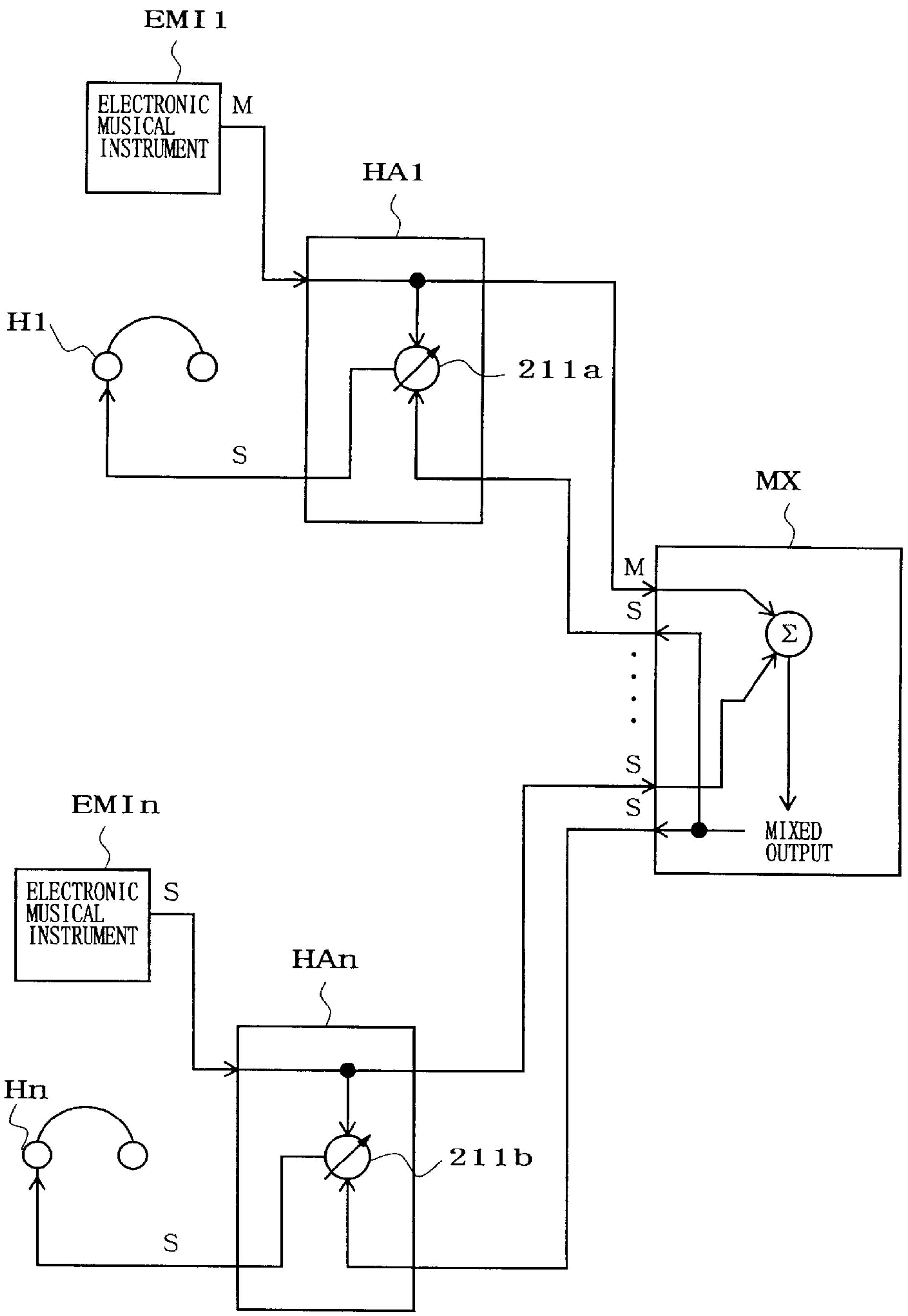
FIG. 6 is a block diagram illustrating a modification of the circuit shown in FIG. 3.
Figure 7:
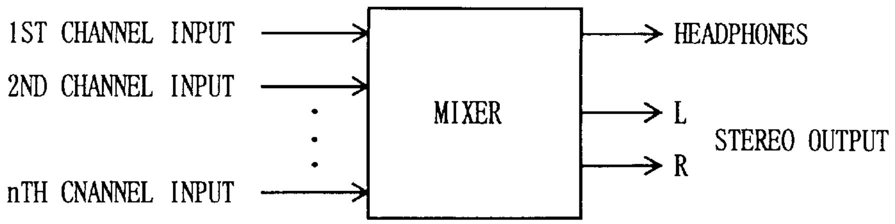
(PRIOR ART) FIG. 7
FIG. 7 is a diagram showing an example of a conventional portable mixer.
Figure 8:
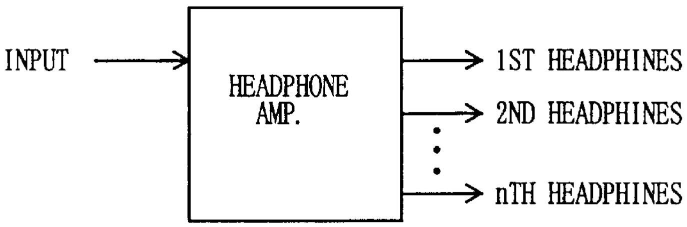
(PRIOR ART) FIG. 8
FIG. 8 is a diagram showing an example of a conventional headphone amplifier.
Figure 9:
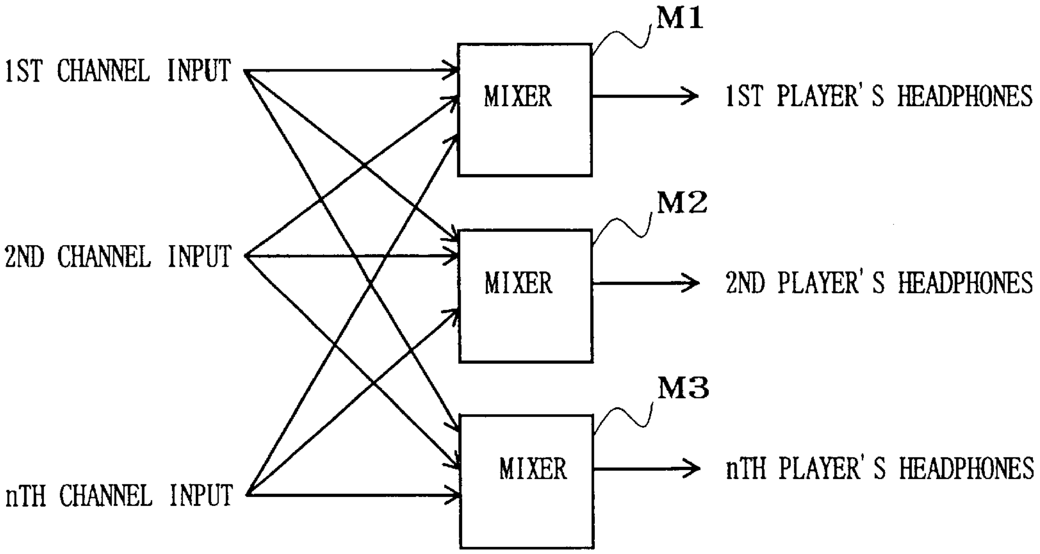
(PRIOR ART) FIG. 9
FIG. 9 is a diagram showing an example manner in which a conventional mixer is used.

Further, the control panel arrangement in FIG. 2B or 2C may be modified as shown in FIG. 5; namely, all of the solo-performance volume controls are replaced by balance volume controls. Further, in the embodiment of FIG. 3, the structure of the headphone amplifiers HA1 and HAn may be modified as shown in FIG. 6; in this case, output signals M and S from the electronic musical instruments EMI1 and EMIn and an output signal from the mixer MX are fed to respective balance volume controls 211*a* and 211*b*, and outputs from the volume controls 211*a* and 211*b* are supplied to the respective headphones H1 and Hn.

In summary, the present invention having been described so far is arranged to allow each of the players to listen to or monitor his or her own solo performance in addition to ensemble-performance tones, with the result that each of the players can ascertain whether his or her own solo performance as well as the whole ensemble performance is progressing as desired.

What is claimed is:

1. An amplifier device for use with a headphone comprising:

a first input terminal that receives a first audio signal from an external source;

a first output terminal that provides said first audio signal, received via said first input terminal, to outside said amplifier device;

a second input terminal that receives a second audio signal from an external source;

a mixing circuit that mixes said first and second audio signals received via said first and second input terminals, said mixing circuit including an operator for adjusting mixing levels of said first and second audio signals; and a second output terminal that supplies an output from said mixing circuit to said headphone, wherein said first output terminal is connected to an input of an audio mixer device and said second input terminal is connected to an output of the audio mixer device, and wherein an output signal from the audio mixer device is received by said second input terminal as said second audio signal.

2. An amplifier device as recited in claim 1 wherein said operator of said mixing circuit adjusts levels of said first and second audio signals using balance volume control.

3. An amplifier device as recited in claim 1 wherein said operator of said mixing circuit adjusts a level of one of said first and second audio signals.

4. A mixer system comprising:

a main mixing section including a plurality of input terminals that receives audio signals, said main mixing section separately adjusting a volume level of each of the audio signals received via said input terminals and mixing the audio signals, having been adjusted in volume level, to provide a mixed signal; and an individual mixing section including: a first input terminal that receives a first audio signal from an external source; a first output terminal that provides said first audio signal, received via said first input terminal, to outside said individual mixing section; a second input terminal that receives a second audio signal from outside said individual mixing section; a mixing circuit that mixes said first and second audio signals received via said first and second input terminals, said mixing circuit including an operator for adjusting mixing levels of said first and second audio signals; and a second output terminal that supplies an output from said mixing circuit, wherein said mixer system can include a plurality of said individual mixing sections depending on a specific number of said input terminals of said main mixing section, the audio signal from said first output terminal of said individual mixing sections being supplied to said input terminals of said main mixing section, the mixed signal from said main mixing section being supplied to said second input terminal of said individual mixing sections.

5. An amplifier device suitable for use with a headphone, said amplifier device being suitable for use in combination with a mixer device having a first mixing circuit that mixes audio signals received via a plurality of input channels and thereby outputs a mixed audio signal, said amplifier device comprising:

a first input terminal that receives a first audio signal from a first external source corresponding to one of said plurality of input channels;

a first output terminal that provides said first audio signal, received via said first input terminal, to outside said amplifier device, said first output terminal being connectable to an input terminal for the one of said plurality of input channels in said mixer device;

a second input terminal that receives a second audio signal from a second external source, wherein said second input terminal is capable of receiving, as said second audio signal, the mixed audio signal outputted by said mixer device functioning as said second external source;

a second mixing circuit that mixes said first and second audio signals received via said first and second input terminals, said second mixing circuit including an operator for adjusting mixing levels of said first and second audio signals; and a second output terminal that supplies an output from said second mixing circuit to said headphone.

6. An amplifier device as recited in claim 5 wherein said operator of said second mixing circuit adjusts levels of said first and second audio signals using balance volume control.

7. An amplifier device as recited in claim 5 wherein said operator of said second mixing circuit adjusts a level of one of said first and second audio signals.

* * * * *